A. B. WERHAN.
FADING IN AND OUT SHUTTER FOR PICTURE PROJECTING APPARATUS.
APPLICATION FILED JUNE 19, 1920.
1,403,364.
Patented Jan. 10, 1922.
3 SHEETS—SHEET 1.
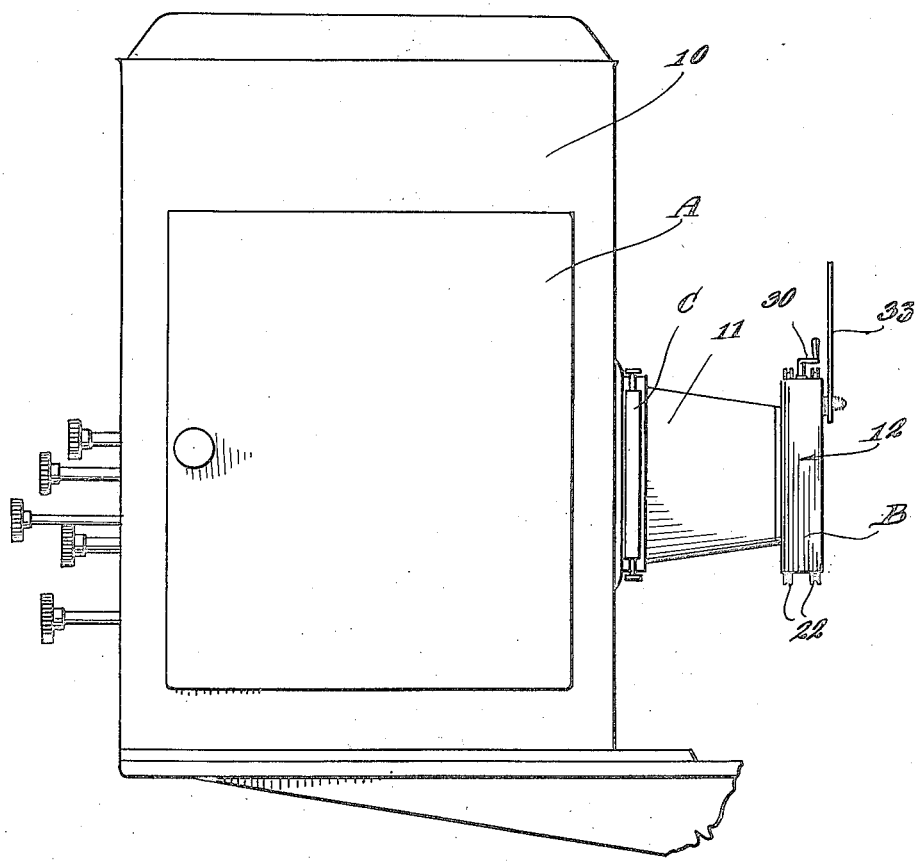
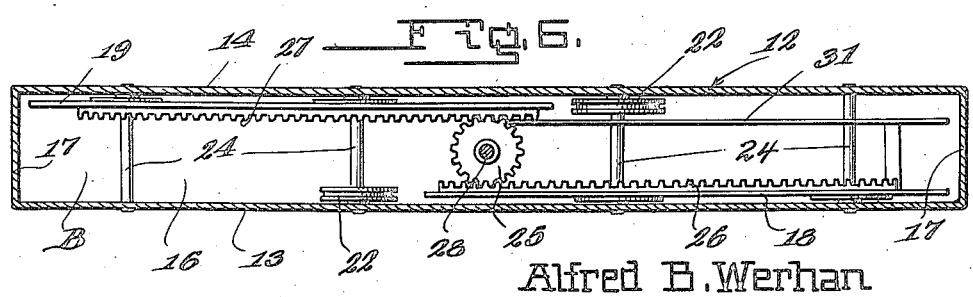
Alfred B. Werhan,
Inventor

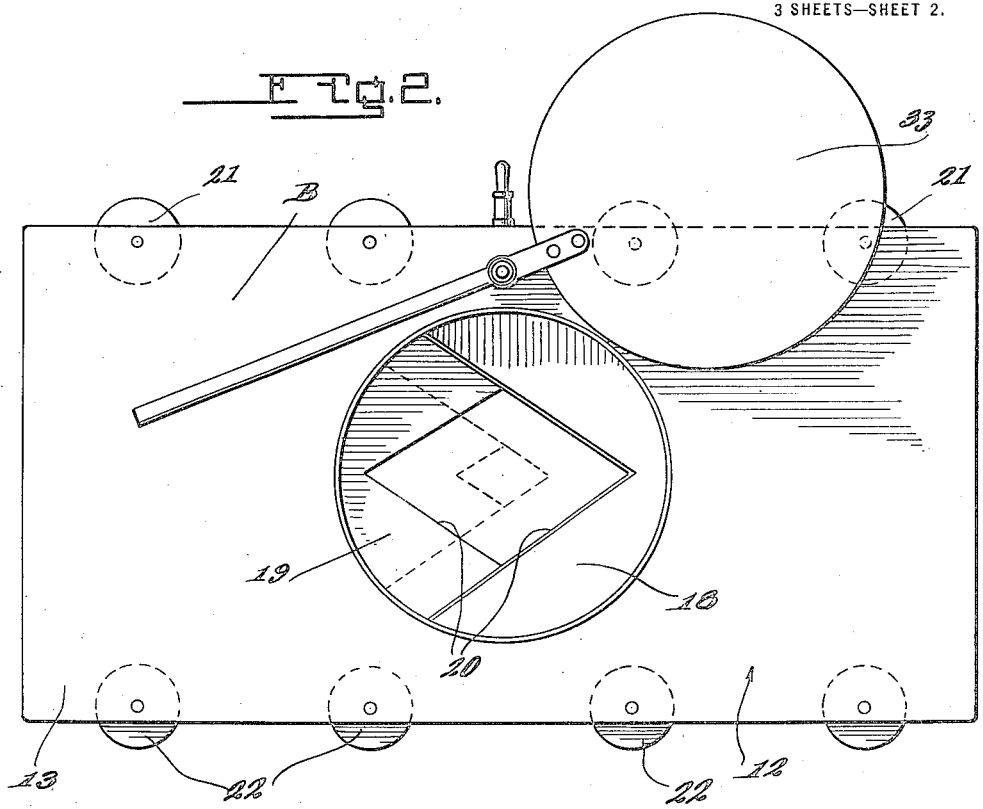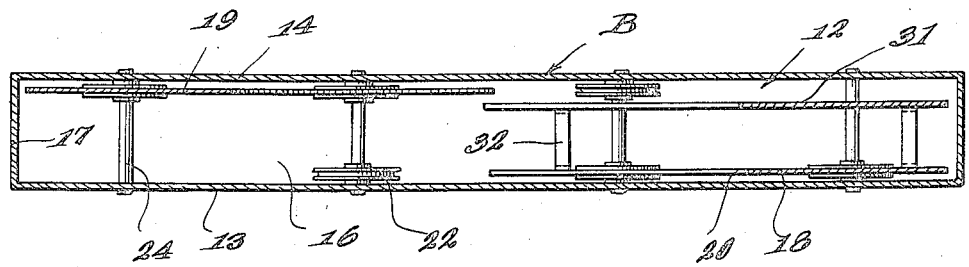

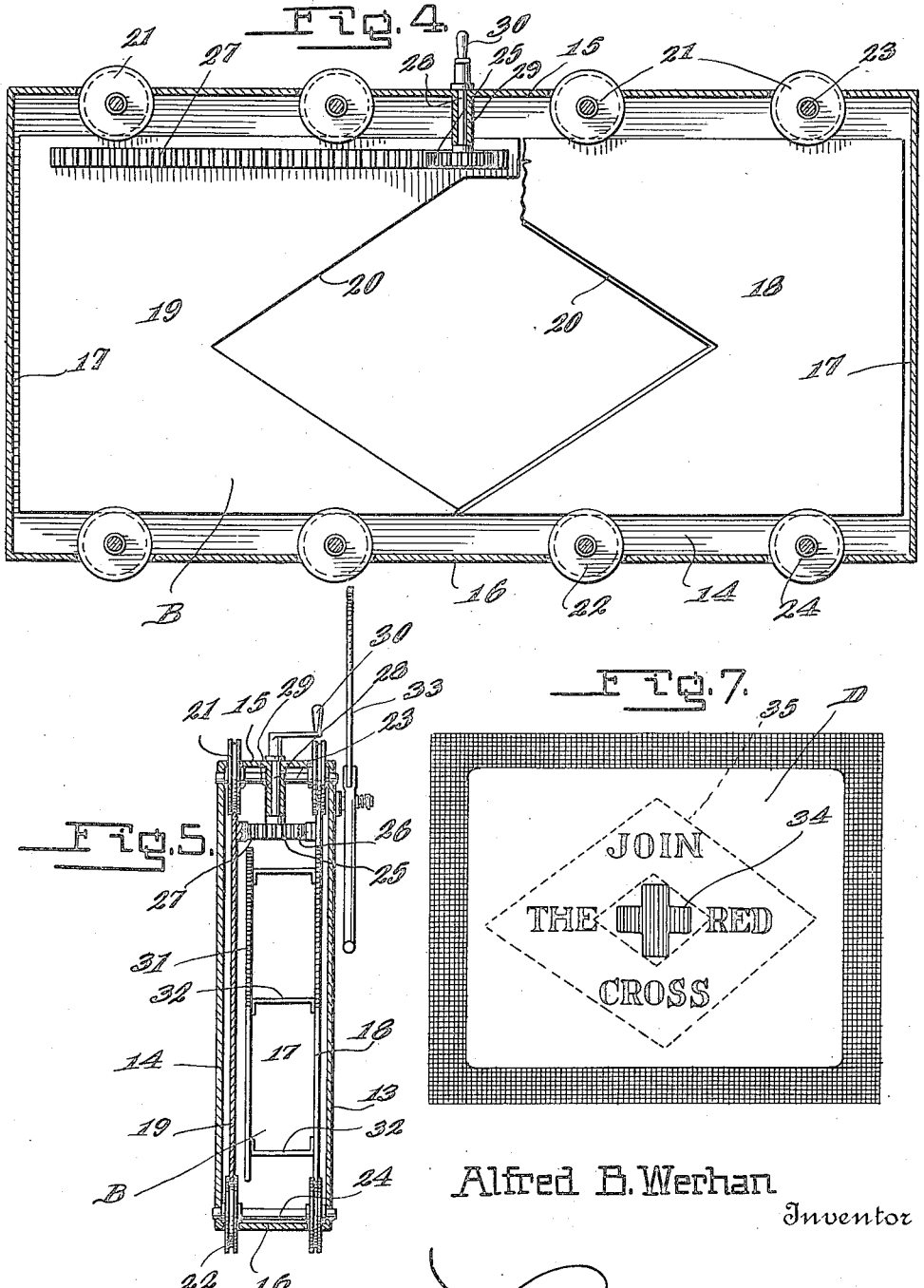

UNITED STATES PATENT OFFICE.

ALFRED B. WERHAN, OF AKRON, OHIO.

FADING IN AND OUT SHUTTER FOR PICTURE-PROJECTING APPARATUS.

1,403,364. Specification of Letters Patent. Patented Jan. 10, 1922.

Application filed June 19, 1920. Serial No. 390,102.

*To all whom it may concern:*

Be it known that I, ALFRED B. WERHAN, a citizen of the United States, residing at Akron in the county of Summit and State of Ohio, have invented certain new and useful Improvements in Fading In and Out Shutters for Picture - Projecting Apparatus, of which the following is a specification.

This invention relates to attachments for picture projecting machines and the primary object of the invention is to provide an improved means for dissolving views for a stereopticon machine, so as to enable the operator to beautify the presentation of stereopticon slides and thus increase the popularity thereof.

It has been heretofore contemplated by certain manufacturers of moving picture and stereopticon machines to dissolve or gradually fade in and out the projection of stereopticon views by the provision of a so called "Iris diaphragm dissolver" but owing to the fact that this dissolver is relatively complicated and very expensive, the same has not been universally adopted or met with universal approval. It is therefore a prime object of the invention to provide a dissolver which shall be exceedingly simple in construction, easy and cheap to manufacture, one that can be readily used with any type of stereopticon machine and one that can be easily operated.

A further object of the invention is the provision of a dissolver for stereopticon machines embodying a pair of blades which are so arranged and shaped that a diamond shaped opening is provided for the beam of light, the said opening being adapted to be gradually increased in size so that the picture being presented will be gradually enlarged on the screen.

A still further object of the invention is the provision of an improved means for simultaneously operating the two blades or plates, which make up the shutter or dissolver, the operating means being so constructed as to permit the easy and convenient actuation thereof by one hand of the operator.

With these and other objects in view, the invention consists in the novel construction, arrangement and formation of parts as will be hereinafter more specifically described, claimed and illustrated in the accompanying drawings, forming a part of this specification, in which drawings:

Figure 1 is a side elevation of a stereopticon machine showing the improved dissolver or fading in and out shutter applied thereto.

Figure 2 is a front elevation of the improved dissolver or fading in and out shutter.

Figure 3 is a longitudinal horizontal section through the same.

Figure 4 is a vertical longitudinal section through the improved dissolver parts of one of the blades being shown broken away.

Figure 5 is a vertical transverse central section through the dissolver.

Figure 6 is a horizontal longitudinal section through the same illustrating the means for operating the blades or plates of the shutter, and Figure 7 is an elevation of a screen showing a view projected thereon and illustrating in dotted lines the configuration and size of the light opening formed by the shutter blades or plates.

Referring to the drawings in detail, wherein similar reference characters designate corresponding parts throughout the several views, the letter A generally indicates a stereopticon machine and B the improved dissolver or fading in or out shutter.

The stereopticon machine A may be of any preferred or improved type and includes the lamp housing 10 and the light condenser or funnel 11, which is provided with the usual opening for the reception of a stereopticon slide carrier designated by the letter C.

As shown the improved dissolver or fading in and out shutter B is secured to the forward end of the light condenser or funnel 11 and the same may be secured in place by any preferred means. The fading in and out shutter or dissolver B includes a substantially rectangular casing 12 which consists of the front and rear walls 13 and 14 the upper and lower walls 15 and 16, and the side walls 17. The front and rear walls 13 and 14 are provided with the aligned openings for permitting the projection of the light beam therethrough.

Slidably mounted in the casing 12 is a pair of blades 18 and 19. These blades or plates are preferably stamped out of sheet metal or the like and have the inner edges thereof provided with semi-diamond shaped cut out portions 20, the apex portions of which are in direct horizontal alignment with each other so that a substantially diamond shaped opening will be formed at all times during the opening and sliding movement of the blades or plates 18 and 19. To permit of the easy sliding of the plates or blades 18 and 19 in the casing 12 to gradually increase or decrease the size of the opening formed by the semi-diamond shaped cut out portions 20 and to prevent the displacement of the blades or plates from their operative positions, upper and lower guide rollers 21 and 22 are provided. The upper and lower guide rollers 21 and 22 are rotatably mounted upon the upper and lower shafts 23 and 24 which are secured in any preferred manner to the front and rear walls 13 and 14 of the casing 12. The upper and lower walls 15 and 16 of the casing 12 are provided with slots for the reception of the guide rollers. As shown these guide rollers are mounted in pairs and one plate is adapted to engage one roller of each pair while the other plate is adapted to engage the other roller of each pair.

These plates or blades 18 and 19 are adapted to be moved toward or away from each other to enlarge or decrease the size of the opening formed thereby by means of a single pinion 25 the opposite sides of which are adapted to mesh with rack bars 26 and 27 carried by the inner faces of the blades or plates 18 and 19. Thus it can be seen that when the pinion is rotated the blades or plates 18 and 19 will be synchronously operated. The pinion 25 is keyed or otherwise secured to the depending vertically disposed shaft 28 which is rotatably mounted in a suitable bearing 29 carried by the inner surface of the upper wall 15 of the casing. The upper end of the shaft 28 projects beyond the outer face of the upper wall 15 and is provided with a suitable operating crank 30 whereby the pinion can be readily turned.

Owing to the fact that the blades 18 and 19 will be spaced relatively far apart owing to the provision of a single pinion for operating the same, a third plate 31 is provided which is of the same configuration as the plate 18 and is carried thereby by suitable brackets or the like 32. The plate 31 is positioned directly in rear of the plate 18 in relatively close proximity to the plate or blade 18 and it can be seen that owing to the fact that the plates 31 and 18 are positioned in relatively close proximity the seeping of light between the same when the plates are in their fully closed position is absolutely precluded. Owing to the fact that a third plate 31 is provided it is not necessary that the plate 18 should have the exact configuration as shown as it is to be understood that the same can be of open configuration and of such a shape as to provide means for supporting the rack bar 26 and a means for engaging the lower guide rollers 22.

The forward end of the casing 11 is also provided with the usual dowser 33 which may be of any preferred configuration or shape and this dowser 33 is adapted to be used when the machine is not in use or when slides are being changed. However the dowser can be eliminated if so desired as the plates or blades will form an efficient means for cutting off light from the screen.

In operation of the improved device, the slide carrier C containing a slide is placed in the machine in the usual manner and the crank 30 is operated so as to position the blades in overlapped relation so as to close the opening, after which the crank 30 is gradually turned which will move the plates away from each other and thus gradually increase the size of the picture being projected on the screen, and thus beautify and enhance the presentation of stereopticon views.

In Figure 7 is shown a screen designated by the numeral D on which a view has been projected. The inner dotted line designated by the numeral 34 shows the size of the view when the plates are in a partially opened position and the dotted line designated by the numeral 35 indicates the size of the view when the plates are almost in their fully opened position. When the plates are in their fully opened position the picture being projected will be of the usual size and shape. If it is desired to gradually fade out the picture it is merely necessary to reverse the rotation of the crank 30 which will gradually bring the plates or blades toward each other and thus gradually decrease the size of the opening and corresponding size of the picture.

From the foregoing description it can be seen that an exceptionally simple and durable device has been provided for effectively dissolving or fading in and out the pictures projected from stereopticon machines.

Changes in details may be made without departing from the spirit or scope of this invention; but,

I claim:

1. In a fading in and out shutter for picture projecting machines, a casing having openings therein for permitting the projection of the light beam therethrough, a pair of plates slidably carried by the casing and arranged for movement toward and away from said openings, rack bars formed on the inner faces of said plates, said rack bars being arranged in direct horizontal alignment, a vertically positioned shaft rotatably carried by the casing, a horizontally positioned pinion having its opposite sides meshing with the rack bar, a crank carried by the shaft and arranged exteriorly of the casing for rotating said pinion whereby the plates will be moved toward and away from each other and the openings, the inner edges of said plates having V-shaped notches formed therein.

2. In a fading in and out shutter for picture projecting machines, a casing having openings formed therein for permitting the projection of light rays therethrough, pairs of upper and lower guide rollers carried by the casing, a pair of imperforate plates carried by the guide rollers arranged for movement toward and away from each other on said openings, the inner edges of said plates having V-shaped notches formed therein, the apexes of said notches being in direct horizontal alignment whereby a substantially diamond shaped opening will be formed by said plates, a depending bearing sleeve carried by the casing, a shaft rotatably carried by the bearing sleeve, a pinion keyed to said shaft, rack bars carried by the inner faces of said blades arranged to engage the opposite faces of said pinion, and a crank formed on said shaft arranged exteriorly of the casing.

3. In a dissolver for picture projecting machines, a casing, pairs of upper and lower guide rollers carried by the casing, the casing having openings formed therein for permitting the projection of light rays therethrough, pairs of oppositely disposed plates slidably carried by said rollers and arranged to be moved toward and away from each other and said openings, rack bars carried by the inner faces of said plates, a pinion meshing with said rack bars, means for operating the pinion, a third plate carried by one of said first mentioned plates and positioned in relatively close proximity to the other plate, said plates having V-shaped notches formed in the inner edges thereof.

4. The combination with a picture projecting machine including a light condenser, of a fading in and out shutter therefor including a casing having openings formed therein arranged in alignment with said light condenser, guide rollers carried by the upper and lower portions of said casing, oppositely disposed plates arranged in said casing and adapted for movement toward and away from each other and said openings, rack bars carried by the inner faces of said plates, a pinion meshing with said rack bars, means for operating said pinion, a third plate carried by one of the first mentioned plates and arranged in close proximity to the other of the first mentioned plates, said plates having V-shaped notches formed in the inner faces thereof.

ALFRED B. WERHAN.